July 17, 1928. 1,677,803
A. R. TENGER
CULTIVATOR, WEEDER, AND DIGGER
Filed May 10, 1926
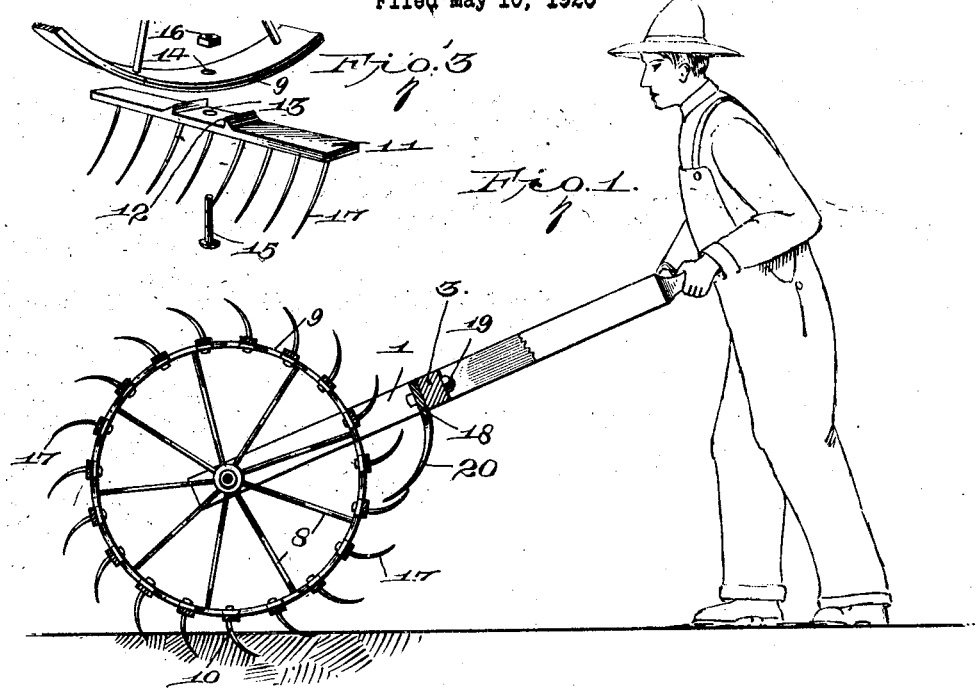
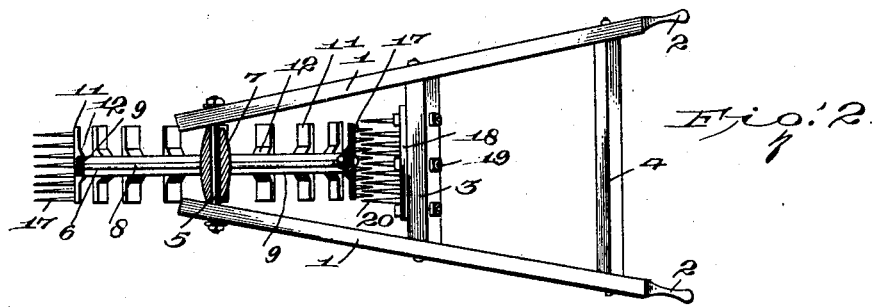
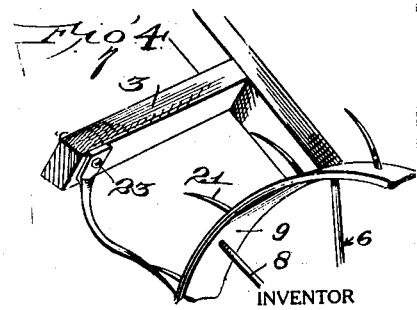
INVENTOR
Albert R. Tenger
BY
ATTORNEYS Patented July 17, 1928.

1,677,803

UNITED STATES PATENT OFFICE.

ALBERT R. TENGER, OF MARSHFIELD, OREGON.

CULTIVATOR, WEEDER, AND DIGGER.

Application filed May 10, 1926. Serial No. 108,089.

This invention relates to a machine for use as a cultivator, weeder, or digger and aims to provide a device of this character which is of simple and durable construction, reliable, effective and speedy in operation and easy and comparatively inexpensive to manufacture.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a view partly in side elevation and partly in longitudinal vertical section showing one embodiment of the invention.

Figure 2 is a view partly in plan and partly in transverse horizontal section,

Figure 3 is a group view in fragmentary perspective showing how the cultivating element for securing the rim to the wheel, Figure 4 is a fragmentary group view showing the action of the cleaner prong.

Referring to the drawings, the numeral 1 designates a pair of combination frame members and handles, the combination frame members and handles consisting of bars arranged to diverge from each other rearwardly and terminating in hand grips 2. Transverse connecting members 3 and 4 extend between the combination frame and handle members 1 and are secured thereto to maintain the elements in their proper position. At the forward ends of the members 1 an axle 5 is mounted thereon and on this axle 5 a wheel 6 is mounted, the wheel 6 having a hub 7, spokes 8 and a rim 9. At spaced points around the rim 9 earth-working elements, designated generally at 10, are provided. Each earth-working element includes a plate-like body 11 having lugs 12 which snugly fit against the lateral faces of the rim 9 to hold the plate 11 against lateral displacement or angular movement. Between the lugs 12 each plate 11 is formed with a bolt hole 13 which registers with a similar bolt hole 14 provided in the rim 9. Through each set of registering bolt holes 13 and 14 a bolt 15 is inserted and is held in securing position by means of a nut 16. Each plate 11 carries a plurality of outwardly extending earth-working prongs 17, each prong 17 extending outwardly from the rim of the wheel and curving forwardly and in the direction of rotation thereof.

Means is provided for cleaning the prongs 17 and consists of a carrier plate 18 bolted, as at 19, to the cross member 3 and carrying a plurality of downwardly and forwardly curved cleaning prongs 20 which are staggered with respect to the prongs 17, as illustrated in Figure 2.

I claim:—

A machine of the character described comprising a frame, a wheel rotatably mounted on the frame and having a rim, a plurality of earth-working elements mounted on the rim, each earth-working element including a transversely extending plate having spaced lugs engaging the opposite sides of the rim, a bolt and nut for fastening the plate to the rim, and a plurality of curved earth-working prongs mounted on each plate.

ALBERT R. TENGER.